Patented Aug. 10, 1926.

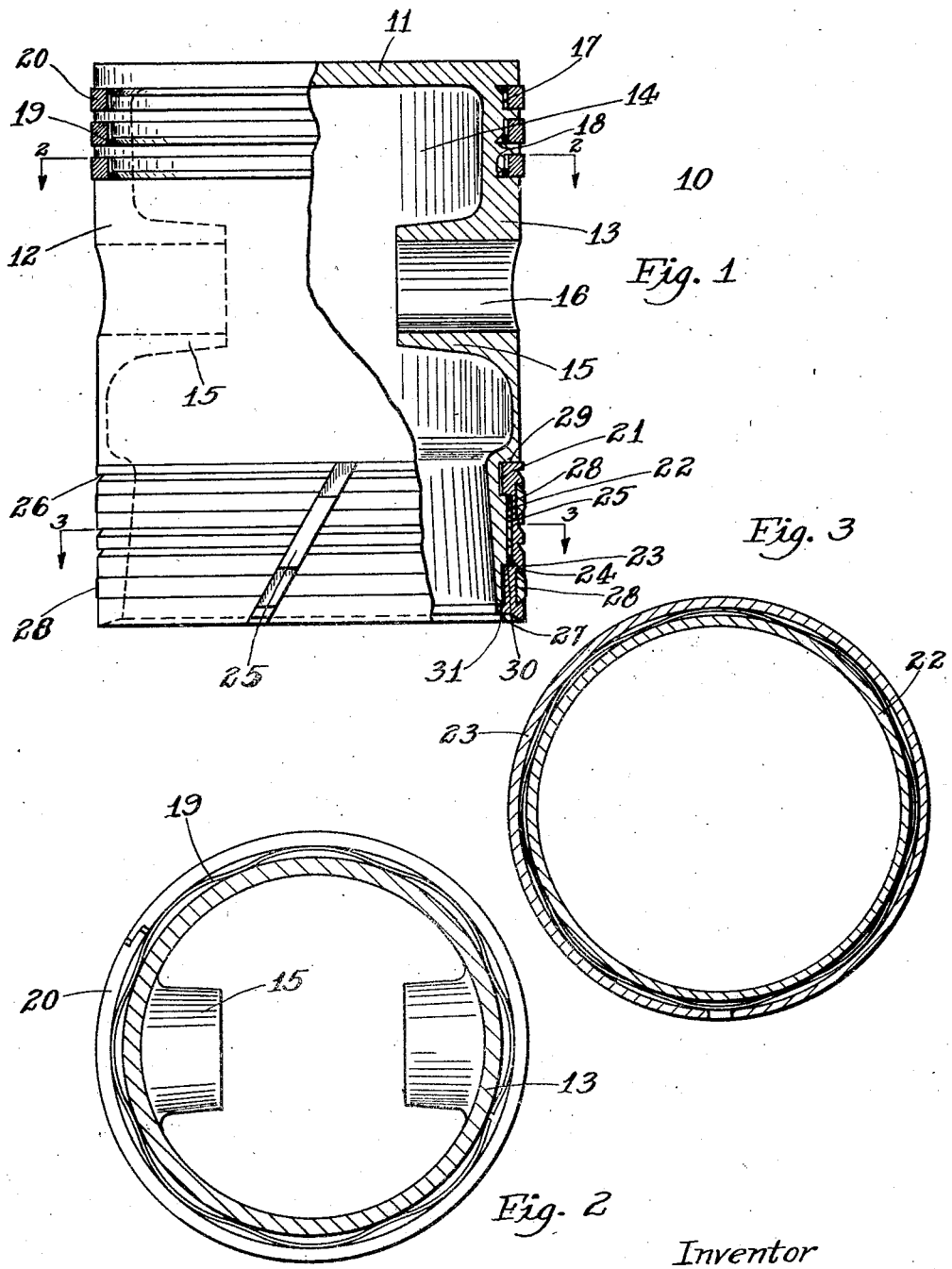

1,595,641

UNITED STATES PATENT OFFICE.

RALPH M. BURDICK, OF LOS ANGELES, CALIFORNIA.

PISTON FOR INTERNAL-COMBUSTION ENGINES.

Application filed December 2, 1924. Serial No. 753,468.

This invention relates to improvements in pistons for internal combustion engines.

It is a broad primary object of the invention to provide a light weight piston which will neither freeze in the motor or expand sufficiently to score the cylinder walls of the motor.

In order to produce a piston of light weight, it is a common practice to employ aluminum or aluminum alloys for the body of the piston. Aluminum has the property of having a high co-efficient of expansion so that when the body of the piston becomes warm, it expands and engages the cylinder walls of the motor so tightly as to either freeze or score the walls. If the piston has its external diameter considerably smaller than the bore of the cylinder so as to overcome this defect, the piston does not tightly fit within the cylinder and is apt to slap.

An object of the invention is to provide a piston having an aluminum or aluminum alloys body which is smaller than the bore of the cylinder within which it is adapted to reciprocate, and which will not slap within the cylinder or expand so as to freeze or score the cylinder.

With the foregoing and other objects in view which will be made manifest in the following detailed description and pointed out in the appended claim, reference is had to the accompanying drawings for an illustrative embodiment of the invention, wherein:

Figure 1 is a side elevation, parts being broken away and shown in vertical section, of the improved piston, Fig. 2 is a horizontal section taken substantially upon the line 2—2 of Fig. 1, and Fig. 3 is a horizontal section taken substantially upon the line 3—3 of Fig. 1.

Referring to the accompanying drawings wherein similar reference characters designate similar parts throughout, the improved piston consists of a piston shaped body, generally designated at 10, formed of aluminum, aluminum alloys, or equivalent light weight material. The body of the piston is provided with a top 11 having integral therewith side walls 12 and 13 so as to form a hollow interior 14 in the piston. Bosses 15 extend into the interior 14 of the piston and provide bearing surfaces 16 for the wrist pin (not shown). Annular recesses 17 are formed adjacent the top 11 upon the sides of the piston and these recesses are provided with grooves 18 in their bottoms which receive springs 19. The annular recesses 17 receive piston rings 20 of conventional construction. The springs 19 are formed of wire and are bent so as to engage the body of the piston and the rings 20, holding the rings concentrically about and in spaced relation to the body.

Adjacent the bottom of the body of the piston an annular recess 21 is formed which is provided with an annular projection 22. A split band 23 formed of aluminum alloy or equivalent material is disposed within the recess 21 and is provided with a groove 24 in the back side thereof which receives the projection 22. A flat spring 25 is disposed in the groove 24 between the projection 22 and the band 23. The flat spring 25 is bent similar to the springs 19 so as to engage the body of the piston and the split band 23 so as to hold the band concentrically about and in spaced relation to the body of the piston. Oil grooves 26 are formed upon the exterior surface of the split band 23. The split band 23 constitutes the exterior surface of the lower portion of the piston and extends around the bottom edge of the body forming a rim 27.

A pair of split rings of cast iron 28 are imbedded in the exterior surface of the split band 23, and in the preferred construction, these rings are dove-tailed into the band 23. These rings form or provide wearing surfaces for the band 23 against the cylindrical walls.

It will be noted that the split band 23 has three different surfaces engaging the body as indicated at 29, 30 and 31, which prevent upward movement of the split band 23 upon the body or skirt of the piston. By providing a plurality of bearing surfaces which prevent the upward movement of the split band 23 upon the skirt, the tendency of the band to become loose within the recess 21 is greatly eliminated.

The external diameter of the body of the piston is smaller than the bore of the cylinder in which the piston is adapted to reciprocate. The rings 20 and the split band 23 are the only portions of the piston which engage the cylinder walls. When the piston becomes warm and expands, the diameter of the body expands, but does not expand sufficiently to score or freeze upon the cylinder walls. The springs 19 and 25 hold the body of the piston concentrically within the piston rings 20 and the split band 23, so that although the body of the piston is of less diameter than the bore of the cylinder, it will not be permitted to slap against the walls thereof.

The piston rings 20 prevent the escape of fuel from the explosion chamber in the cylinder downwardly past the sides of the body, and the oil grooves 26 and the rim 27 tend to keep the oil splashed up from the crank case from slipping by the sides of the piston and the piston rings and from entering the explosion chamber in such quantities as to foul the spark plugs and form carbon upon the surfaces of the explosion chamber.

From the above it is seen that a light weight piston is provided which will neither freeze nor score upon the cylinder walls and which will not slap.

It will be understood that various changes in the detail of construction may be made without departing from the spirit and scope of the invention as defined by the appended claim.

I claim:

A piston comprising a piston shaped body having an external diameter smaller than the bore of the cylinder in which the piston is adapted to reciprocate, a split band mounted about said body adjacent the bottom of the skirt thereof, and rings providing wearing surfaces for said band imbedded therein.

In testimony whereof I have signed my name to this specification.

R. M. BURDICK.